United States Patent
Lee et al.

(10) Patent No.: US 10,557,066 B2
(45) Date of Patent: Feb. 11, 2020

(54) ADHESIVE COMPOSITION FOR PHOTOCURABLE INTERFACE AND SURFACE MODIFICATION METHOD OF SUBSTRATE USING THE SAME

(71) Applicant: CHEM OPTICS INC., Daejeon (KR)

(72) Inventors: Hyung-Jong Lee, Sejong (KR); Nam Seob Baek, Daejeon (KR); Jonghwi Lee, Daejeon (KR); Yun Jung Seo, Daejeon (KR); Jin-Kwon Jeong, Daejeon (KR)

(73) Assignee: Chem Optics Inc., Daejeon (KR)

( * ) Notice: Subject to any disclaimer, the term of this patent is extended or adjusted under 35 U.S.C. 154(b) by 0 days.

(21) Appl. No.: 15/312,601

(22) PCT Filed: Oct. 6, 2016

(86) PCT No.: PCT/KR2016/011165
§ 371 (c)(1),
(2) Date: Nov. 18, 2016

(87) PCT Pub. No.: WO2017/061778
PCT Pub. Date: Apr. 13, 2017

(65) Prior Publication Data
US 2018/0201816 A1 Jul. 19, 2018

(30) Foreign Application Priority Data

Oct. 7, 2015 (KR) ........................ 10-2015-0140769

(51) Int. Cl.
*C09J 183/06* (2006.01)
*C03C 17/30* (2006.01)
(Continued)

(52) U.S. Cl.
CPC .............. *C09J 183/06* (2013.01); *C03C 17/30* (2013.01); *C09D 181/08* (2013.01); *C09J 151/085* (2013.01); *C09J 183/08* (2013.01)

(58) Field of Classification Search
None
See application file for complete search history.

(56) References Cited

U.S. PATENT DOCUMENTS 4,689,085 A * 8/1987 Plueddemann ......... C03C 17/30
106/287.14
5,167,706 A * 12/1992 Kuszaj ..................... C09D 4/00
106/287.11

(Continued)

FOREIGN PATENT DOCUMENTS

JP 2006519924 A 8/2006
JP 2007530725 A 11/2007
(Continued)

OTHER PUBLICATIONS

Li, R., "Development of a ceramic primer with higher bond durability for resin cement," Journal of Oral Rehabilitation, vol. 37, No. 7, Jul. 2010, Published Online Jan. 31, 2010, 9 pages.

*Primary Examiner* — Robert S Loewe
(74) *Attorney, Agent, or Firm* — McCoy Russell LLP

(57) ABSTRACT

The present invention relates to an adhesive composition capable of improving adhesion force between two interfaces through thermal crosslinking and photo-crosslinking of a substrate and a resin, or a resin and a resin, in processes for optical devices and electronic devices, and a preparation method thereof. Specifically, the present invention relates to an adhesive composition capable of adhering an interface between a substrate and a photocurable resin, and a method of adhering an interface using the same.

10 Claims, 1 Drawing Sheet

(51) Int. Cl.
*C09D 181/08* (2006.01)
*C09J 151/08* (2006.01)
*C09J 183/08* (2006.01)

(56) References Cited

U.S. PATENT DOCUMENTS

| | | | | |
|---|---|---|---|---|
| 6,132,808 | A * | 10/2000 | Brown | C09D 4/00 427/387 |
| 6,652,977 | B2 * | 11/2003 | Zhang | C09D 4/00 106/287.11 |
| 6,827,981 | B2 * | 12/2004 | van Ooij | C23C 22/48 427/387 |
| 7,351,473 | B2 * | 4/2008 | Gonthier | C03C 25/26 252/8.83 |
| 7,994,249 | B2 * | 8/2011 | van Ooij | C09D 4/00 524/188 |
| 8,372,937 | B2 * | 2/2013 | Trabesinger | B65D 81/3222 401/132 |
| 2001/0056157 | A1 * | 12/2001 | Terry | C09D 183/06 524/588 |
| 2005/0020758 | A1 * | 1/2005 | Terry | C09D 4/00 524/492 |
| 2008/0081120 | A1 * | 4/2008 | Van Ooij | C09D 5/002 427/387 |
| 2009/0209689 | A1 * | 8/2009 | Gimvang | C09D 1/00 524/266 |

FOREIGN PATENT DOCUMENTS

| | | |
|---|---|---|
| JP | 2007314746 A | 12/2007 |
| KR | 1020080051148 A | 6/2008 |

\* cited by examiner

ADHESIVE COMPOSITION FOR PHOTOCURABLE INTERFACE AND SURFACE MODIFICATION METHOD OF SUBSTRATE USING THE SAME

CROSS-REFERENCE TO RELATED APPLICATIONS the present application is a U.S. National Phase of International Patent Application Ser. No. PCT/KR2016/011165, entitled "ADHESIVE COMPOSITION FOR UV-CROSS-LINKABLE INTERFACE AND SURFACE MODIFICATION METHOD OF SUBSTRATE USING THEREOF," filed on Oct. 6, 2016. International Patent Application Ser. No. PCT/KR2016/011165 claims priority to Korean Patent Application No. 10-2015-0140769, filed Oct. 7, 2015. The entire contents of each of the above-cited applications are hereby incorporated by reference for all purposes.

TECHNICAL FIELD

The present invention relates to an adhesive composition capable of improving adhesion force between two interfaces through thermal crosslinking and photo-crosslinking of a substrate and a resin, or a resin and a resin, in processes for optical devices and electronic devices, and a preparation method thereof. Specifically, the present invention relates to an adhesive composition capable of adhering an interface between a substrate and a photocurable resin, and a method of adhering an interface using the same.

BACKGROUND ART

Adhesion force between homogeneous materials or between heterogeneous materials in optical and electronic devices is an important factor in manufacturing the devices. Most adhesives are made of an acrylic composition, but particularly, in the case of an optical waveguide device using a fluorine-based polymer and a nanoimprint using a fluorine compound to increase release property of a mold, heterogeneous interfacial binding force between a silicon (Si) wafer or a glass substrate and the fluorine-based material is weak, and thus, there is difficulty in manufacturing the devices due to a peeling phenomenon of the resin from the substrate.

Even at the time of manufacturing a multilayer thin layer laminated device of a resin as well as the heterogeneous interface, it is required to develop a multifunctional adhesive capable of forming a thin layer by spin coating, and having excellent adhesion force between two interfaces and adhesion uniformity over a large area. For this purpose, a self-assembled monolayer is formed on the substrate to improve adhesion force of the thin layer form. This formation is to form an adhesion layer which is the self-assembled monolayer by immersing the substrate in a solution, or by chemical vapor deposition. However, this method has difficulty in being applied to a large area substrate, and does not secure uniformity of the adhesion layer. Therefore, the present inventors made an effort to provide a new adhesive composition capable of having adhesion uniformity over a large area, and improving interfacial adhesion force of various photocrosslinkable polymers, and completed the present invention.

DISCLOSURE

Technical Problem

An object of the present invention is to provide a composition for promoting adhesion for photocurable interface including a material for forming a thin layer, i.e., an organic functional silane compound and a silane compound for maximizing properties of the organic functional silane compound, the organic functional silane compound simultaneously having a functional group capable of reacting with a photocurable resin and a functional group for improving adhesion property with a substrate, thereby having adhesion uniformity over a large area, forming a uniform thin layer, and having excellent adhesion property and light transmittance.

Another object of the present invention is to provide an adhesive composition capable of being applied to form a thin layer of an optical device, an electronic device, and a display device.

Technical Solution

In order to achieve the objects, the present invention provides an adhesive composition for photocurable interface simultaneously including: an organic functional silane compound having two different kinds of organic functional groups, and a silane compound having one of the functional groups and maximizing properties of the organic functional silane compound.

In one general aspect, an adhesive composition for photocurable interface includes an organic functional silane compound represented by Chemical Formula 1 below, and a silane compound represented by Chemical Formula 2 below:

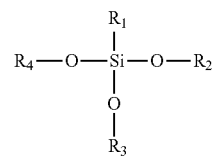
[Chemical Formula 1]

in Chemical Formula 1, $R_1$ is $C_3$-$C_{20}$alkyl or $C_3$-$C_{20}$alkenyl substituted with an organic functional group selected from mercapto, epoxy, methacryloxy, acryloxy, chloro, cyano, ketone, aldehyde, carboxylate, amine, $C_1$-$C_{10}$alkylamine, amide, isocyanurate, glycidyloxy and $C_1$-$C_{10}$alkylamino, and $R_2$, $R_3$ and $R_4$ are the same as each other or different from each other, and each independently selected from $C_1$-$C_{10}$alkyl, $C_1$-$C_{10}$alkyl substituted with $C_1$-$C_{10}$alkoxy, and $C_6$-$C_{20}$aryl, and

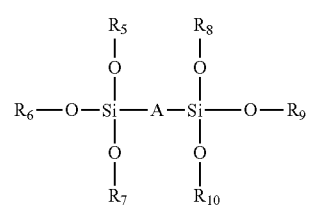
[Chemical Formula 2]

in Chemical Formula 2, $R_5$, $R_6$, $R_7$, $R_8$, $R_9$ and $R_{10}$ are each independently selected from $C_1$-$C_{10}$alkyl, $C_1$-$C_{10}$alkyl substituted with $C_1$-$C_{10}$alkoxy, and $C_6$-$C_{20}$aryl, and A is selected from $C_1$-$C_{10}$alkylene, $C_2$-$C_4$alkenylene, $C_6$-$C_{20}$arylene,

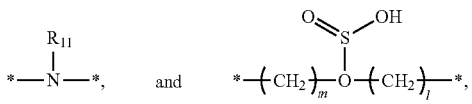

wherein $R_{11}$ is $C_1$-$C_{10}$alkyl, and m and l are each independently an integer selected from 1 to 5.

In Chemical Formula 1, preferably, $R_1$ may be $C_3$-$C_{20}$alkyl substituted with an organic functional group selected from mercapto, methacryloxy, acryloxy, amine, amide, glycidyloxy and $C_1$-$C_{10}$alkylamino, and $R_2$, $R_3$, and $R_4$ may be each independently $C_1$-$C_5$alkyl.

In Chemical Formula 2, preferably, $R_5$, $R_6$, $R_7$, $R_8$, $R_9$ and $R_{10}$ may be each independently selected from $C_1$-$C_{10}$alkyl, and A may be selected from $C_1$-$C_{10}$alkylene, $C_2$-$C_4$alkenylene, $C_6$-$C_{20}$arylene,

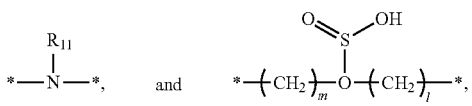

wherein $R_{11}$ may be $C_1$-$C_{10}$alkyl, and m and l may be each independently an integer selected from 1 to 5, but the present invention is not limited thereto.

The compound represented by Chemical Formula 1 may be selected from 3-methacryloxypropyltrimethoxysilane, 3-methacryloxypropyltriethoxysilane, 3-acryloxypropyltrimethoxysilane, 3-acryloxypropyltriethoxysilane, 3-glycidoxypropyltrimethoxysilane, 3-glycidoxypropyltriethoxysilane, 3-mercaptopropyltriethoxysilane, 3-aminopropyltrimethoxysilane, 3-aminopropyltriethoxysilane, and n-methylaminopropyltrimethoxysilane.

The compound represented by Chemical Formula 2 may be selected from bistrimethoxysilylethane, bistriethoxysilylethane, bistrimethoxysilylmethane, bistriethoxysilylmethane, bistriethoxysilyloctane, bistriethoxysilylethylene, 1,4-bistriethoxysilylbenzene, bistriethoxysilylpropylamine, bis-3-triethoxysilylpropylbisulfite, bistriethoxysilylpropane, and bistrimethoxysilylhexane.

The organic functional silane compound represented by Chemical Formula 1 may have 0.01 to 2 wt % of the total composition, and the silane compound represented by Chemical Formula 2 may have 0.001 to 0.5 wt % of the total composition.

The adhesive composition may include the organic functional silane compound represented by Chemical Formula 1, the silane compound represented by Chemical Formula 2, a pH adjuster, and a solvent.

In another general aspect, a surface modification method of a substrate includes: applying the adhesive composition for photocurable interface as described above to any one substrate selected from a silicon wafer or a glass substrate; and drying the composition to form a coating layer.

The applying may be performed by a method selected from spin coating, bar coating, and spray coating.

The coating layer may have a dry application thickness of 1 to 10 nm.

The drying may be heat drying at 100 to 150° C. for 1 to 60 minutes.

Advantageous Effects

The adhesive composition for interface according to the present invention may be easily applied, and may have excellent adhesion force not only between homogeneous materials, but also between heterogeneous materials, and may be used to manufacture a uniform thin layer over a large area.

DETAILED DESCRIPTION OF MAIN ELEMENTS

Figure 1:
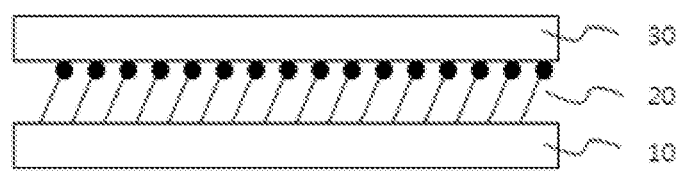
FIG. 1 shows an exemplary embodiment to which an adhesive composition for interface according to the present invention is applied.
Figure 2:
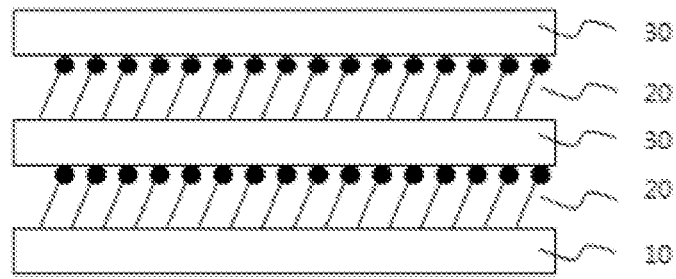
FIG. 2 shows another exemplary embodiment to which an adhesive composition for interface according to the present invention is applied.

10: Substrate
20: Adhesive composition for interface
30: Resin

BEST MODE

Hereinafter, an adhesive composition for interface according to the present invention, and a surface modification method of a substrate using the same will be described in more detail according to specific exemplary embodiments or Examples including the accompanying drawings. Meanwhile, the following exemplary embodiments or Examples are provided as a reference for explaining the present invention in detail, and therefore, the present invention is not limited thereto, but may be implemented in various ways.

Unless defined otherwise, all technical and scientific terms used herein have the same meanings generally understood by those skilled in the art to which the present invention pertains. Terms used in the specification of the present invention are to effectively describe specific exemplary embodiments, but are not intended to limit the present invention.

It is intended that singular forms used in the appended specification and claims include plural forms unless otherwise indicated in the context.

The adhesive composition for photocurable interface of the present invention is applied to "an interface" between "a photocurable resin thin layer" and "a substrate" to express adhesion, and the adhesive composition for photocurable interface of the present invention is possible to be subjected to thermal curing.

Terms: 'alkyl', and 'substituents including alkyl part' used herein include all linear or branched types, and 'alkenyl' includes all of linear types or branched types, containing 2 to 8 carbon atoms and at least one double bond.

An embodiment of the present invention is the adhesive composition for photocurable interface includes an organic functional silane compound represented by Chemical Formula 1 below, and a silane compound represented by Chemical Formula 2 below:

[Chemical Formula 1]

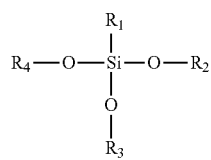

in Chemical Formula 1, $R_1$ is $C_3$-$C_{20}$alkyl or $C_3$-$C_{20}$alkenyl substituted with an organic functional group selected from mercapto, epoxy, methacryloxy, acryloxy, chloro, cyano, ketone, aldehyde, carboxylate, amine, $C_1$-$C_{10}$alkylamine, amide, isocyanurate, glycidyloxy and $C_1$-$C_{10}$alkylamino, and $R_2$, $R_3$ and $R_4$ are the same as each other or different from each other, and each independently selected from $C_1$-$C_{10}$alkyl, $C_1$-$C_{10}$alkyl substituted with $C_1$-$C_{10}$alkoxy, and $C_6$-$C_{20}$aryl, and

[Chemical Formula 2]

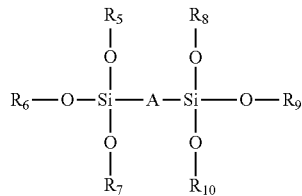

in Chemical Formula 2, $R_5$, $R_6$, $R_7$, $R_8$, $R_9$ and $R_{10}$ are each independently selected from $C_1$-$C_{10}$alkyl, $C_1$-$C_{10}$alkyl substituted with $C_1$-$C_{10}$alkoxy, and $C_6$-$C_{20}$aryl, and A is selected from $C_1$-$C_{10}$alkylene, $C_2$-$C_4$alkenylene, $C_6$-$C_{20}$arylene,

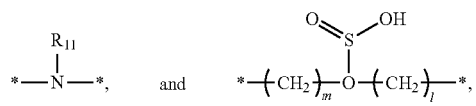

wherein $R_{11}$ is $C_1$-$C_{10}$alkyl, and m and l are each independently an integer selected from 1 to 5.

The adhesive composition for photocurable interface of the present invention may have more improved adhesion force by including the silane compound having the organic functional groups and being represented by Chemical Formula 1. In particular, the silane compound has two different kinds of organic functional groups, wherein one functional group may be bonded to a substrate and the other functional group may be bonded to a photocurable resin.

More preferably, in Chemical Formula 1, $R_1$ is $C_3$-$C_{10}$alkyl substituted with an organic functional group selected from mercapto, methacryloxy, acryloxy, amine, amide, glycidyloxy and $C_1$-$C_{10}$alkylamino, and $R_2$, $R_3$, and $R_4$ are each independently $C_1$-$C_5$alkyl.

More specifically, the compound represented by Chemical Formula 1 may be selected from 3-methacryloxypropyltrimethoxysilane, 3-methacryloxypropyltriethoxysilane, 3-acryloxypropyltrimethoxysilane, 3-acryloxypropyltriethoxysilane, 3-glycidoxypropyltrimethoxysilane, 3-glycidoxypropyltriethoxysilane, 3-mercaptopropyltriethoxysilane, 3-aminopropyltrimethoxysilane, 3-aminopropyltriethoxysilane, and n-methylaminopropyltrimethoxysilane, but is not limited thereto.

The organic functional silane compound represented by Chemical Formula 1 preferably has 0.01 to 2 wt %, still preferably, 0.05 to 1 wt %, and more preferably, 0.1 to 0.5 wt % of the total composition. Within a range at which the organic functional silane compound represented by Chemical Formula 1 has 0.01 to 2 wt %, it is preferred since sufficient modification of a substrate surface is performed, storage stability of a mixed solution is excellent, and foreign materials do not occur on a surface at the time of coating.

In an exemplary embodiment of the present invention, the silane compound represented by Chemical Formula 2 is used to form a chemical bond together with the organic functional silane compound represented by Chemical Formula 1 and to further maximize effects of the organic functional silane compound represented by Chemical Formula 1. The silane compound represented by Chemical Formula 2 and the organic functional silane compound represented by Chemical Formula 1 may be simultaneously mixed to achieve physical properties to be desired.

In an exemplary embodiment of the present invention, in the silane compound represented by Chemical Formula 2, more specifically, $R_5$, $R_6$, $R_7$, $R_8$, $R_9$ and $R_{10}$ are each independently selected from $C_1$-$C_{10}$alkyl, and A is selected from $C_1$-$C_{10}$alkylene, $C_2$-$C_4$alkenylene, $C_6$-$C_{20}$arylene,

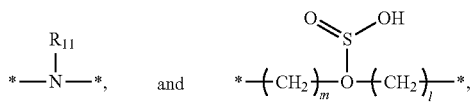

wherein $R_{11}$ is $C_1$-$C_{10}$alkyl, and m and l are each independently an integer selected from 1 to 5.

More specifically, the compound represented by Chemical Formula 2 may be selected from bistrimethoxysilylethane, bistriethoxysilylethane, bistrimethoxysilylmethane, bistriethoxysilylmethane, bistriethoxysilyloctane, bistriethoxysilylethylene, 1,4-bistriethoxysilylbenzene, bistriethoxysilylpropylamine, bis-3-triethoxysilylpropylbisulfite, bistriethoxysilylpropane, and bistrimethoxysilylhexane, but is not limited thereto.

The silane compound represented by Chemical Formula 2 preferably has 0.001 to 0.5 wt %, still preferably, 0.01 to 0.1 wt %, and more preferably, 0.01 to 0.05 wt % of the total composition. Within the above-described content range, it is preferred since sufficient modification of a substrate surface is performed, storage stability of a mixed solution is excellent, and foreign materials do not occur on a surface at the time of coating.

In an exemplary embodiment of the present invention, the adhesive composition for photocurable interface may include a pH adjuster, and a solvent, in addition to the organic functional silane compound represented by Chemical Formula 1 and the silane compound represented by Chemical Formula 2.

The pH of the organic functional silane compound represented by Chemical Formula 1 and the silane compound represented by Chemical Formula 2 may affect stability of a hydroxyl group. High acidity of the composition accelerates hydrolysis and condensation reaction of an alkoxysilyl group of the silane. Accordingly, as pH of the composition is close to be neutral, storage stability of the solution may be more excellent. However, since the hydrolysis of the alkoxysilyl group is not completely performed in the neutral pH, it is not possible to achieve sufficient increase in adhesion force.

In an exemplary embodiment of the present invention, the composition may include the pH adjuster for performing appropriate hydrolysis, and may include both organic and inorganic acids. As examples thereof, nitric acid, sulfuric acid, hydrochloric acid, phosphoric acid, acetic acid, carbonic acid, boric acid, etc., may be used together with water.

In an exemplary embodiment of the present invention, the pH of the adhesive composition for photocurable interface is preferably 3 to 7, and more preferably 3.5 to 5. When the pH of the composition is less than 3, the hydrolysis and the condensation reaction of the mixed solution may be promoted to inhibit the storage stability, and when the pH of the composition is more than 7, the hydrolysis may not be appropriately performed, and thus, it is difficult to expect improvement in adhesion force.

Further, the composition may include the solvent to improve miscibility of each component of the adhesive composition for photocurable interface according to the present invention. The solvent is preferably alcohols such as methanol, ethanol, propanol, isopropanol, butanol, methoxypropanol, etc., and the most preferably, methoxypropanol, which is because the adhesion force is more improved even though the reason of improvement in adhesion force has not been figured out yet. A content of the solvent may have a range so that total content is satisfied to be 100 wt % except for the content of the organic functional silane compound represented by Chemical Formula 1 and the content of the silane compound represented by Chemical Formula 2.

In an exemplary embodiment of the present invention, a viscosity of the adhesive composition for photocurable interface may be 2.5 to 3.5 cps measured at 25° C., and the viscosity thereof is not limited thereto. Within the above-described viscosity range, a uniform layer having a monolayer form may be formed, and the storage stability may be excellent.

In still another exemplary embodiment of the present invention, the present invention provides a surface modification method of any one substrate selected from a silicon wafer or a glass substrate using the adhesive composition for photocurable interface as described above.

Specifically, the surface modification method of a substrate includes: applying the adhesive composition for photocurable interface as described above to any one substrate selected from a silicon wafer or a glass substrate; and drying the composition to form a coating layer.

Further, after the drying of the composition to form the coating layer, the surface modification method may further include forming a thin layer by applying a photocurable resin, followed by photocuring. Here, the photocurable resin may be a fluorine-based polymer.

In an exemplary embodiment of the present invention, the applying may be performed by a method selected from spin coating, bar coating, and spray coating.

More preferably, the spin coating is performed. Specifically, when a 4-inch wafer substrate is used, 0.5 to 2 mL of the resin may be applied and spin-coated by using a spin coater at 1,000 to 4,000 rpm/30 seconds. When the number of spin coating rotations is 1,000 or less per minute, liquid foreign materials may remain on the substrate surface, and a temperature for drying after the spin coating is preferably 80 to 150° C.

In addition, in an exemplary embodiment of the present invention, the drying may be performed by heating. A temperature for heating is preferably 100 to 150° C., and more preferably, 120 to 130° C., and time for heating may be 1 to 60 minutes, and more preferably, 5 to 30 minutes, which is preferred since it is possible to form a coating layer having excellent adhesion force.

The coating layer formed by the method may have a dry application thickness of 10 nm or less, and more specifically, 1 to 10 nm. When the coating layer has the above-described thickness range, it does not affect subsequent processes, and adhesion may be excellent.

Hereinafter, the present invention is described in detail on the basis of Examples and Comparative Examples. Meanwhile, the following Examples and Comparative Examples are provided by way of example for explaining the present invention in more detail, and therefore, the present invention is not limited thereto.

1) Evaluation of Adhesion Force

In order to confirm adhesion force, a photocurable resin (CO-150 manufactured by CHEMOPTICS, including epoxy acrylate and an acrylate monomer as main components, and having a viscosity of 50 cps measured at 25° C.) was cured to form a film, and then, 100 grid patterned scratches were caused on the film surface using a cross cut test (ASTM D3359), and peeling was tested using an adhesive tape. The adhesion force was calculated by counting the number of scratches and the number of films adhered to the adhesive tape according to the following Equation.

Adhesion force=(the number of scratches−the number of films adhered to the adhesive tape)×100

2) Evaluation of Storage Stability

The storage stability was evaluated by spin coating on a weekly basis, confirming whether liquid foreign materials remained on the substrate by a microscope, and checking the adhesion force by the same method as above to confirm whether there was any change.

3) Surface Layer Quality State

The coating was performed using a spin coater, and immediately after the coating, and after thermal crosslinking, whether the liquid foreign materials remained was confirmed by the microscope. When the liquid foreign materials remained, round shaped droplets were shown, and on the contrary, the clear layers were observed without such traces.

EXAMPLE 1

1) Preparation of Adhesive Composition for Photocurable Interface

Methoxypropanol 95 g, distilled water 4.89 g, 3-methacryloxypropyltrimethoxysilane 0.1 g, and bistrimethoxysilylethane 0.01 g were put into a Nalgene 100 ml PE container, and stirred for 24 hours.

2) Surface Modification Method of Substrate

The adhesive composition for photocurable interface prepared in 1) above was applied on a silicon wafer substrate, and was subjected to spin coating at 3,000 rpm/30 seconds. Heat drying was performed in a hot plate at 120° C. for 5 minutes to perform surface modification of the substrate.

In order to confirm the adhesion force, the above-explained photocurable resin (CO-150 manufactured by CHEMOPTICS, including epoxy acrylate and an acrylate monomer as main components, and having a viscosity of 50 cps measured at 25° C.) was applied, and photocured by irradiating UV of 15 mW/cm$^2$ for 3 minutes under nitrogen atmosphere, thereby manufacturing specimen.

Physical properties of the manufactured specimen were measured and shown in Table 2 below.

EXAMPLE 2

Example 2 was performed by the same method as Example 1 except that methanol was used as the solvent rather than using methoxypropanol in Example 1.

Physical properties of the manufactured specimen were measured and shown in Table 2 below.

EXAMPLE 3

Example 3 was performed by the same method as Example 1 except that isopropanol was used as the solvent rather than using methoxypropanol in Example 1.

Physical properties of the manufactured specimen were measured and shown in Table 2 below.

EXAMPLE 4

Example 4 was performed by the same method as Example 1 except that a drying temperature for the heat drying in step 2) of Example 1 above was 100° C.

Physical properties of the manufactured specimen were measured and shown in Table 2 below.

EXAMPLE 5

Example 5 was performed by the same method as Example 1 except that a drying temperature for the heat drying in step 2) of Example 1 above was 80° C.

Physical properties of the manufactured specimen were measured and shown in Table 2 below.

EXAMPLE 6

Example 6 was performed by the same method as Example 1 except that 3-methacryloxypropyltrimethoxysilane 0.05 g and distilled water 4.94 g were used.

Physical properties of the manufactured specimen were measured and shown in Table 2 below.

EXAMPLE 7

Example 7 was performed by the same method as Example 1 except that 3-methacryloxypropyltrimethoxysilane 0.01 g and distilled water 4.98 g were used.

Physical properties of the manufactured specimen were measured and shown in Table 2 below.

EXAMPLE 8

Example 8 was performed by the same method as Example 1 except that bistrimethoxysilylethane 0.1 g and distilled water 4.98 g were used.

Physical properties of the manufactured specimen were measured and shown in Table 2 below.

EXAMPLE 9

Example 9 was performed by the same method as Example 1 except that 3-acryloxypropyltrimethoxysilane 0.1 g and bistriethoxysilylethane 0.01 g were used in the preparation of the adhesive composition for photocurable interface.

Physical properties of the manufactured specimen were measured and shown in Table 2 below.

EXAMPLE 10

Example 10 was performed by the same method as Example 1 except that 3-glycidoxypropyltrimethoxysilane 0.1 g and bistriethoxysilylethane 0.01 g were used in the preparation of the adhesive composition for photocurable interface.

Physical properties of the manufactured specimen were measured and shown in Table 2 below.

EXAMPLE 11

Example 11 was performed by the same method as Example 1 except that 3-mercaptopropyltriethoxysilane 0.1 g and bistriethoxysilylethane 0.01 g were used in the preparation of the adhesive composition for photocurable interface.

Physical properties of the manufactured specimen were measured and shown in Table 2 below.

EXAMPLE 12

Example 12 was performed by the same method as Example 1 except that 3-aminopropyltrimethoxysilane 0.1 g and bistriethoxysilylethane 0.01 g were used in the preparation of the adhesive composition for photocurable interface.

Physical properties of the manufactured specimen were measured and shown in Table 2 below.

EXAMPLE 13

Example 13 was performed by the same method as Example 1 except that n-methylaminopropyltrimethoxysilane 0.1 g and bistriethoxysilylethane 0.01 g were used in the preparation of the adhesive composition for photocurable interface.

Physical properties of the manufactured specimen were measured and shown in Table 2 below.

EXAMPLE 14

Example 14 was performed by the same method as Example 1 except that 3-methacryloxypropyltriethoxysilane 0.1 g and bistriethoxysilylbenzene 0.01 g were used in the preparation of the adhesive composition for photocurable interface.

Physical properties of the manufactured specimen were measured and shown in Table 2 below.

EXAMPLE 15

Example 15 was performed by the same method as Example 1 except that 3-methacryloxypropyltriethoxysilane 0.1 g and bistriethoxysilyloctane 0.01 g were used in the preparation of the adhesive composition for photocurable interface.

Physical properties of the manufactured specimen were measured and shown in Table 2 below.

EXAMPLE 16

Example 16 was performed by the same method as Example 1 except that 3-methacryloxypropyltriethoxysilane 0.1 g and bistriethoxysilylethylene 0.01 g were used in the preparation of the adhesive composition for photocurable interface.

Physical properties of the manufactured specimen were measured and shown in Table 2 below.

COMPARATIVE EXAMPLE 1

1) Preparation of Adhesive Composition for Photocurable Interface

Methoxypropanol 95 g, distilled water 4.5 g, and 3-methacryloxypropyltrimethoxysilane 0.5 g were put into a Nalgene 100 ml PE container, and stirred for 24 hours.

2) Surface Modification Method of Substrate

The adhesive composition for photocurable interface prepared in 1) above was applied on a silicon wafer substrate, and was subjected to spin coating at 3,000 rpm/30 seconds. Thermal drying was performed in a hot plate at 120° C. for 5 minutes to perform surface modification of the substrate.

In order to confirm the adhesion force, the above-explained photocurable resin (CO-150 manufactured by CHEMOPTICS, including epoxy acrylate and an acrylate monomer as main components, and having a viscosity of 50 cps measured at 25° C.) was applied, and photocured by irradiating UV of 15 mW/cm² for 3 minutes under nitrogen atmosphere, thereby manufacturing specimen.

Physical properties of the manufactured specimen were measured and shown in Table 2 below.

COMPARATIVE EXAMPLE 2

Comparative Example 2 was performed by the same method as Comparative Example 1 except that the content of 3-methacryloxypropyltrimethoxysilane was changed to 0.3 g and the content of distilled water was changed to 4.7 g as shown in Table 1 below.

Physical properties of the manufactured specimen were measured and shown in Table 2 below.

COMPARATIVE EXAMPLE 3

Comparative Example 3 was performed by the same method as Comparative Example 1 except that the content of 3-methacryloxypropyltrimethoxysilane was changed to 0.1 g and the content of distilled water was changed to 4.9 g as shown in Table 1 below.

Physical properties of the manufactured specimen were measured and shown in Table 2 below.

TABLE 1

| | Chemical Formula 1 (wt %) | Chemical Formula 2 (wt %) | Distilled water (containing acid, wt %) | Solvent | Drying temperature (° C.) |
|---|---|---|---|---|---|
| Comparative Example 1 | 0.5 | 0 | 4.5 | Methoxypropanol | 120 |
| Comparative Example 2 | 0.3 | 0 | 4.7 | Methoxypropanol | 120 |
| Comparative Example 3 | 0.1 | 0 | 4.9 | Methoxypropanol | 120 |
| Example 1 | 0.1 | 0.01 | 4.89 | Methoxypropanol | 120 |
| Example 2 | 0.1 | 0.01 | 4.89 | Methanol | 120 |
| Example 3 | 0.1 | 0.01 | 4.89 | Isopropanol | 120 |
| Example 4 | 0.1 | 0.01 | 4.89 | Methoxypropanol | 100 |
| Example 5 | 0.1 | 0.01 | 4.89 | Methoxypropanol | 80 |
| Example 6 | 0.05 | 0.01 | 4.94 | Methoxypropanol | 120 |
| Example 7 | 0.01 | 0.01 | 4.98 | Methoxypropanol | 120 |
| Example 8 | 0.1 | 0.1 | 4.98 | Methoxypropanol | 120 |
| Example 9 | 0.1 | 0.01 | 4.89 | Methoxypropanol | 120 |
| Example 10 | 0.1 | 0.01 | 4.89 | Methoxypropanol | 120 |
| Example 11 | 0.1 | 0.01 | 4.89 | Methoxypropanol | 120 |
| Example 12 | 0.1 | 0.01 | 4.89 | Methoxypropanol | 120 |
| Example 13 | 0.1 | 0.01 | 4.89 | Methoxypropanol | 120 |
| Example 14 | 0.1 | 0.01 | 4.89 | Methoxypropanol | 120 |
| Example 15 | 0.1 | 0.01 | 4.89 | Methoxypropanol | 120 |
| Example 16 | 0.1 | 0.01 | 4.89 | Methoxypropanol | 120 |

TABLE 2

| | Surface layer quality state | Storage stability | Adhesion force (Cross cut/Tape test) |
|---|---|---|---|
| Comparative Example 1 | Liquid foreign material occurs | — | 100% |
| Comparative Example 2 | Liquid foreign material occurs | — | 100% |
| Comparative Example 3 | Clear | 60 or more days | 85% |
| Example 1 | Clear | 60 or more days | 100% |
| Example 2 | Clear | 60 or more days | 10% |
| Example 3 | Clear | 60 or more days | 10% |
| Example 4 | Clear | 60 or more days | 70% |
| Example 5 | Clear | 60 or more days | 50% |
| Example 6 | Clear | 60 or more days | 50% |
| Example 7 | Clear | 60 or more days | 10% |
| Example 8 | Clear | 30 or more days | 100% |
| Example 9 | Clear | 60 or more days | 100% |
| Example 10 | Clear | 60 or more days | 100% |
| Example 11 | Clear | 60 or more days | 90% |
| Example 12 | Clear | 60 or more days | 100% |
| Example 13 | Clear | 60 or more days | 90% |
| Example 14 | Clear | 30 or more days | 100% |
| Example 15 | Clear | 60 or more days | 100% |
| Example 16 | Clear | 60 or more days | 100% |

As shown in Table 2 above, it could be appreciated that when the compounds represented by Chemical Formulas 1 and 2 were mixed to be used, the storage stability, the surface layer quality state, and the adhesion force were excellent as compared to those of using the compound represented by Chemical Formula 1 alone.

In addition, as shown in Examples 1 to 3, it was confirmed that when the solvent was changed, the adhesion force was affected, and it could be appreciated that when the methoxypropanol was used, the adhesion force was the most excellent.

Further, as shown in Example 1 and Examples 4 and 5, it was confirmed that when the drying temperature was changed, the adhesion force was affected, and it could be appreciated that as the drying temperature was higher, the adhesion force was increased, and the adhesion force was the most excellent when the drying temperature was 120° C.

Further, as shown in Example 1 and Examples 6 and 7, it was confirmed that when the content of the compound represented by Chemical Formula 1 was changed, the adhesion force was affected, and it could be appreciated that as the content was increased, the adhesion force was improved.

The invention claimed is:

1. An adhesive composition for photocurable interface comprising:
an organic functional silane compound represented by Chemical Formula 1 below,
a silane compound represented by Chemical Formula 2 below, and methoxypropanol:

[Chemical Formula 1]

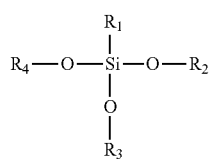

in Chemical Formula 1,
$R_1$ is $C_3$-$C_{20}$ alkyl substituted with an organic functional group selected from the group consisting of mercapto, epoxy, methacryloxy, acryloxy, chloro, cyano, ketone, aldehyde, carboxylate, amine, $C_1$-$C_{10}$ alkylamine, amide, isocyanurate, glycidyloxy and $C_1$-$C_{10}$ alkylamino, and
$R_2$, $R_3$ and $R_4$ are the same as each other or different from each other, and each independently selected from the group consisting of $C_1$-$C_{10}$ alkyl, $C_1$-$C_{10}$ alkyl substituted with $C_1$-$C_{10}$ alkoxy, and $C_6$-$C_{20}$ aryl, and

[Chemical Formula 2]

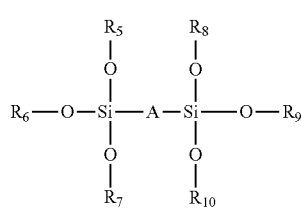

in Chemical Formula 2,
$R_5$, $R_6$, $R_7$, $R_8$, $R_9$ and $R_{10}$ are each independently selected from the group consisting of $C_1$-$C_{10}$ alkyl, $C_1$-$C_{10}$ alkyl substituted with $C_1$-$C_{10}$ alkoxy, and $C_6$-$C_{20}$ aryl, and
A is selected from the group consisting of $C_1$-$C_{10}$ alkylene, and $C_6$-$C_{20}$ arylene; and
wherein the organic functional silane compound represented by Chemical Formula 1 has 0.01 to 2 wt % of the total composition, and the silane compound represented by Chemical Formula 2 has 0.001 to 0.5 wt % of the total composition.

2. The adhesive composition of claim 1, wherein in Chemical Formula 1,
$R_1$ is $C_3$-$C_{20}$ alkyl substituted with an organic functional group selected from the group consisting of mercapto, methacryloxy, acryloxy, amine, amide, glycidyloxy and $C_1$-$C_{10}$ alkylamino, and
$R_2$, $R_3$, and $R_4$ are each independently $C_1$-$C_5$ alkyl.

3. The adhesive composition of claim 1, wherein in Chemical Formula 2,
$R_5$, $R_6$, $R_7$, $R_8$, $R_9$ and $R_{10}$ are each independently selected from the group consisting of $C_1$-$C_{10}$ alkyl, and
A is selected from $C_1$-$C_{10}$ alkylene, and $C_6$-$C_{20}$ arylene.

4. The adhesive composition of claim 1, wherein the compound represented by Chemical Formula 1 is selected from the group consisting of 3-methacryloxypropyltrimethoxysilane, 3-methacryloxypropyltriethoxysilane, 3-acryloxypropyltrimethoxysilane, 3-acryloxypropyltriethoxysilane, 3-glycidoxypropyltrimethoxysilane, 3-glycidoxypropyltriethoxysilane, 3-mercaptopropyltriethoxysilane, 3-aminopropyltrimethoxysilane, 3-aminopropyltriethoxysilane, and N-methylaminopropyltrimethoxysilane.

5. The adhesive composition of claim 1, wherein the compound represented by Chemical Formula 2 is selected from the group consisting of bistrimethoxysilylethane, bistriethoxysilylethane, bistrimethoxysilylmethane, bistriethoxysilylmethane, bistriethoxysilyloctane, bistriethoxysilylethylene, 1,4-bistriethoxysilylbenzene, bistriethoxysilylpropane, and bistrimethoxysilylhexane.

6. The adhesive composition of claim 1, wherein the adhesive composition includes the organic functional silane compound represented by Chemical Formula 1, has the silane compound represented by Chemical Formula 2, a pH adjuster, and the methoxypropanol.

7. A surface modification method of a substrate comprising:
applying the adhesive composition for photocurable interface of claim 1 to any one substrate selected from the group consisting of a silicon wafer or a glass substrate; and
drying the composition to form a coating layer.

8. The surface modification method of claim 7, wherein the applying is performed by a method selected from the group consisting of spin coating, bar coating, and spray coating.

9. The surface modification method of claim 7, wherein the coating layer has a dry application thickness of 1 to 10 nm.

10. The surface modification method of claim 7, wherein the drying is heat drying at 100 to 150° C. for 1 to 60 minutes.

* * * * *